United States Patent
Misra et al.

(10) Patent No.: US 9,934,116 B2
(45) Date of Patent: *Apr. 3, 2018

(54) AUTOMATED LOCAL DATABASE CONNECTION AFFINITY AND FAILOVER

(71) Applicant: International Business Machines Corporation, Armonk, NY (US)

(72) Inventors: Kollol K. Misra, Bangalore (IN); Pallavi Priyadarshini, Bangalore (IN); Parameswara R. Tatini, Bangalore (IN); Maryela E. Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,591

(22) Filed: Jan. 17, 2017

(65) Prior Publication Data
US 2017/0220435 A1    Aug. 3, 2017

Related U.S. Application Data

(63) Continuation of application No. 15/232,931, filed on Aug. 10, 2016, now Pat. No. 9,594,653, which is a
(Continued)

(51) Int. Cl.
G06F 11/20    (2006.01)

(52) U.S. Cl.
CPC ...... *G06F 11/2033* (2013.01); *G06F 2201/80* (2013.01); *G06F 2201/805* (2013.01); *G06F 2201/82* (2013.01)

(58) Field of Classification Search
CPC ............ G06F 11/2069; G06F 11/2066; G06F 11/2092; G06F 11/2094; G06F 17/30165; G06F 17/30306
(Continued)

(56) References Cited

U.S. PATENT DOCUMENTS 7,814,065 B2    10/2010    Chan et al.
8,122,283 B2*    2/2012    Olson ................. G06F 11/2007
                                                                       714/4.1
(Continued)

OTHER PUBLICATIONS

Unknown, "Database JDBC Developer's Guide: 1 Introducing JDBC," Oracle Help Center, Oracle Database Online Documentation 11g Release 2 (11.2), printed Jan. 7, 2016, 13 pages, Copyright © 2015, Oracle. http://docs.oracle.com/cd/E11882_01/java.112/e16548/overvw.htm#JJDBC28028.
(Continued)

*Primary Examiner* — Kamini Patel
(74) *Attorney, Agent, or Firm* — Joseph W. Cruz

(57) ABSTRACT

A first compute node of a plurality of compute nodes of a database cluster may receive a request for a database transaction from a client application. The client application may be located within the first compute node. A first connection may be established, without regard to whether another compute node has a lighter workload than the first compute node, between the client application and a first database of the database cluster. The first connection may be a local connection, wherein the first database is located within the first compute node. The first compute node may detect that a failure associated with the first database has occurred. The first compute node may execute a failover operation to continue servicing the request for the data. The executing of a failover operation may include establishing a second connection between the client application and a second database of the database cluster.

1 Claim, 5 Drawing Sheets

Related U.S. Application Data continuation of application No. 15/014,450, filed on Feb. 3, 2016.

(58) Field of Classification Search
USPC .................................................. 714/4.1, 4.11
See application file for complete search history.

(56) References Cited

U.S. PATENT DOCUMENTS

| | | | | |
|---|---|---|---|---|
| 8,510,591 | B2* | 8/2013 | White | G06F 11/2025 714/1 |
| 8,694,618 | B2* | 4/2014 | Mugundan | H04L 47/624 709/217 |
| 8,738,961 | B2* | 5/2014 | Jain | G06F 11/2028 714/4.11 |
| 8,762,339 | B2* | 6/2014 | Bartholomy | G06F 11/2028 707/640 |
| 8,850,261 | B2* | 9/2014 | Blood | G06F 9/06 714/4.1 |
| 8,935,563 | B1 | 1/2015 | Rajaa et al. | |
| 8,943,364 | B2* | 1/2015 | Bourne | G06F 11/0709 714/26 |
| 9,064,003 | B2 | 6/2015 | Somogyi et al. | |
| 9,110,851 | B2* | 8/2015 | Little | G06F 11/1471 |
| 9,116,861 | B2* | 8/2015 | Bennah | G06F 11/2028 |
| 9,122,652 | B2* | 9/2015 | Bennah | G06F 11/2028 |
| 9,218,401 | B2 | 12/2015 | Dee et al. | |
| 9,594,653 | B1* | 3/2017 | Misra | G06F 11/2092 |
| 2004/0250248 | A1 | 12/2004 | Halpern et al. | |
| 2009/0119536 | A1 | 5/2009 | Guo et al. | |
| 2015/0200818 | A1 | 7/2015 | Winkelstrater | |
| 2015/0286519 | A1 | 10/2015 | Huang et al. | |
| 2016/0170844 | A1 | 6/2016 | Long et al. | |
| 2016/0232031 | A1 | 8/2016 | Farkash et al. | |

OTHER PUBLICATIONS

Unknown, "Database JDBC Developer's Guide:and Reference: 27 Fast Connection Failover," Oracle Help Center, Oracle Database Online Documentation, 10g Release 2 (10.2), printed Jan. 7, 2016, 10 pages, Copyright © 2015, Oracle. http://docs.oracle.com/cd/B19306_01/java.102/b14355/fstconfo.htm#CIHIECJA.

Unknown, "Java client support for high availability for connections to DB2 for Linux, UNIX, and Windows servers," IBM Knowledge Center, DB2 Version 10.1 for Linux, UNIX, and Windows, printed Feb. 3, 2016, 4 pages. http://www-01.ibm.com/support/knowledgecenter/SSEPGG_10.1.0/com.ibm.db2.luw.apdv.java.doc/src/tpc/imjcc_c0056055.html.

Cecchet, E., "C-JDBC: a Middleware Framework for Database Clustering," Bulletin of the Technical Committee on Data Engineering, Special Issue on Database Caching Strategies for Web Content, Jun. 2004, pp. 19-26, vol. 27, No. 2, IEEE Computer Society.

Cecchet et al., "Middleware-based Database Replication: The Gaps Between Theory and Practice," SIGMOD '08: Proceedings of the 2008 ACM SIGMOD International Conference on Management of Data, Jun. 2008, pp. 739-752, ACM.

Thomas, T., "Java Data Access—JDBC, JNDI, and JAXP," Chapters 1, 2, 3, 4, 14, 15, and 19 (pp. 2-58, 224-247, and 332-358), 2002, M&T Books, New York, NY.

Misra et al., "Automated Local Database Connection Affinity and Failover," U.S. Appl. No. 15/014,450, filed Feb. 3, 2016.

Misra et al., "Automated Local Database Connection Affinity and Failover," U.S. Appl. No. 15/232,931, filed Aug. 10, 2016.

Accelerated Examination Support Document dated Aug. 2, 2016 for U.S. Appl. No. 15/232,931, 12 pages.

Misra et al., "Automated Local Database Connection Affinity and Failover," U.S. Appl. No. 15/407,572, filed Jan. 17, 2017.

Accelerated Examination Support Document dated Jan. 16, 2017 for U.S. Appl. No. 15/407,572, 14 pages.

List of IBM Patents or Patent Applications Treated as Related, signed Jan. 17, 2017, 2 pages.

U.S. Appl. No. 15/407,591, filed Jan. 17, 2017.
U.S. Appl. No. 15/407,572, filed Jan. 17, 2017.
U.S. Appl. No. 15/232,931, filed Aug. 10, 2016.
U.S. Appl. No. 15/014,450, filed Feb. 3, 2016.

\* cited by examiner

AUTOMATED LOCAL DATABASE CONNECTION AFFINITY AND FAILOVER

BACKGROUND

This disclosure relates generally to database clustering, and more specifically, to automated local database connection affinity and failover to a distributed connection when a local database fails in a database clustering environment.

The term "database cluster" may refer to two or more compute nodes (e.g., server computing devices). Each compute node includes or is directly associated with a storage device (or devices) that stores a database. The databases associated with the respective compute nodes may be identical, i.e., a single database is replicated on the storage device associated with each compute node. Alternatively, a single database may be partitioned and the databases associated with the respective compute nodes may each contain one of the partitions of the single database. Database clustering may be useful for providing continuous availability of data in case one or more compute nodes or associated databases fail (e.g., because of a failed processor, failed connection path, failed storage device, etc.). When a database fails, a failover operation may be executed such that any database operation that was undertaken but not completed by the failed database is assumed by a different database within another compute node.

In a shared-nothing architecture, each compute node may be responsible for a subset of data of a single database and each process associated with the subset. A particular transaction, for example, may be distributed among various compute nodes in parallel in order to execute the transaction. When a failure occurs at a particular node or the node's database, that node's designated process for a subset of data is transferred to another healthy node that stores the same subset of data. In a shared-everything (or shared disk) architecture, each compute node may have equal access to all of the data, as opposed to a subset of data. In these architectures, when a compute node's database fails, another compute node's database may efficiently take on the responsibilities of the failed database because each node may have shared access to all of the data, thereby enhancing fault or failure tolerance.

SUMMARY

One or more embodiments are directed to a computer-implemented method, a system, and a computer program product for automated local database connection affinity and failover in a database cluster. A first compute node of a plurality of compute nodes of a database cluster may receive a request for a database transaction from a client application. The plurality of compute nodes may share at least a portion of the data. The client application may be located within the first compute node. In response to at least the receiving the request, a first connection may be established, without regard to whether another compute node of the plurality of compute nodes has a lighter workload than the first compute node, between the client application and a first database of the database cluster. The first connection may be a local connection, wherein the first database is located within the first compute node. The first compute node may detect that a failure associated with the first database has occurred. In response to the detecting a failure, the first compute node may execute a failover operation to continue servicing the request for the data. The executing of a failover operation may include establishing a second connection between the client application and a second database of the database cluster. The second database may include the data. The second connection may be a distributed connection, wherein the second database is remote to the first compute node and within a second compute node.

Figure 1:
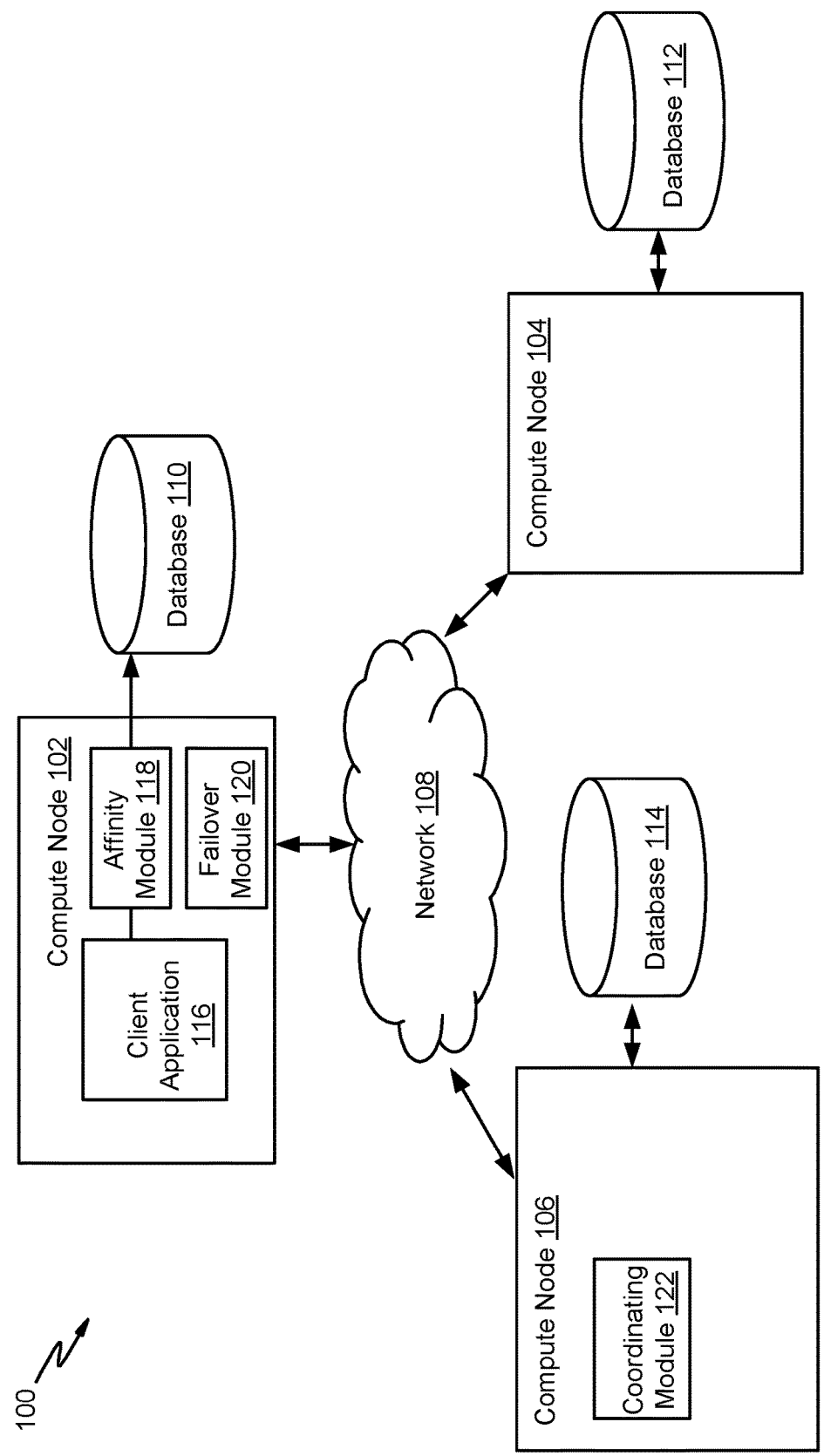
FIG. 1 is a block diagram of a database cluster computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to automated local database connection affinity and failover to a distributed connection when a local database fails in a database clustering environment. While the present disclosure is not necessarily limited to such applications, various aspects of the disclosure may be appreciated through a discussion of various examples using this context.

According to various embodiments, when a request from a client application for database transaction is received by an application interface module on a database cluster compute node, the request may be routed to another compute node that has a lower workload than the compute node. For example, in a Java Database Connectivity (JDBC) Application Program Interface (API), the JDBC device driver on a client processing a request may establish a type four connection with a remote database on the basis of whether a particular compute node has available workload capacity (e.g., CPU availability) to service the request. A type four connection may be referred to herein as a "distributed connection" or a "remote connection" (e.g., a connection over a network that uses a Transmission Control Protocol/Internet Protocol (TCP/IP)). A distributed or remote connection is between a client application requesting a database transaction and a database that is located on a different compute node than the client application. A coordinating module running on a compute node within the database cluster may maintain a real-time server list of Internet Protocol (IP) addresses of each compute node and each compute node's workload or available workload capacity. Each IP address may correspond to a weight calculation, which is a score that represents workload or available workload capacity of each node. The JDBC device driver on the client may utilize the server list in order to determine which compute node the request should be rerouted to. However, rerouting requests via distributed connections may cause unwanted network latency and therefore more elapsed time during transactions. The rerouting of requests may outweigh the benefits of choosing a compute node that incurs the least amount of workload to service requests.

Network latency may be particularly problematic for Online Transaction Processing (OLTP) databases. OLTP databases are transaction-oriented databases that are characterized by frequent updates and small-sized queries that return relatively few records. A database transaction is one or more database operations (e.g., INSERT, UPDATE, DELETE) that make up a unit of work performed against a database. OLTP databases also tend to be normalized. Database normalization is the process of efficiently organizing data in a database. For example, database normalization eliminates redundant data (e.g., normalization eliminates the storing of the same data in more than one table) and stores related data in a single table. OLTP databases may also include a large quantity of concurrent users that engage in short transaction times. Accordingly, fast response times and robust concurrency control may be needed but fast response times may be inhibited by the continuous rerouting of data requests. According to various embodiments, when network latency outweighs the benefit of routing a database transaction request from a compute node having a heavy workload to another compute node having a light workload, the routing protocol may be modified.

According to various embodiments, when an application interface module on a first compute node receives a request for a database transaction from a client application running on the first compute node and a database associated with the first compute node has a copy of the data associated with the transaction within a locally connected storage device, the database associated with the first compute node is used to service the request without regard to (e.g., selectively choosing not to determine by any of the compute nodes) whether another compute node in the cluster may having a lighter workload than the first compute node. In some embodiments, a "workload" may refer to a saturation level of a compute node and/or how many requests/sessions that a compute node is currently undertaking. The client application may utilize shared memory to locally connect to the locally attached database, as opposed to initiating distributed or remote connections (e.g., TCP/IP), which may have the benefit of speeding up transaction times as network latency is eliminated. According to various embodiments, a distributed or remote connection may be established with another compute node in the cluster may having a lighter workload only when the first compute node experiences a failure. Therefore, embodiments of the present disclosure are directed to maintaining local database affinity connections for a request for a database transaction and executing a failover operation by maybe establishing distributed connections when there is a failure associated with the local database.

FIG. 1 is a block diagram of a database cluster computing environment 100, according to embodiments. The database cluster computing environment 100 may include one or more compute nodes, such as compute nodes 102, 104, and 106, each communicatively coupled to a database—databases 110, 112, and 114. The compute nodes and databases may communicate via shared memory (if the databases are within the same compute nodes as a requesting client application) or a network 108. In some embodiments, the database cluster computing environment 100 may be implemented within a cloud computing environment, or use one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 108.

Figure 5:
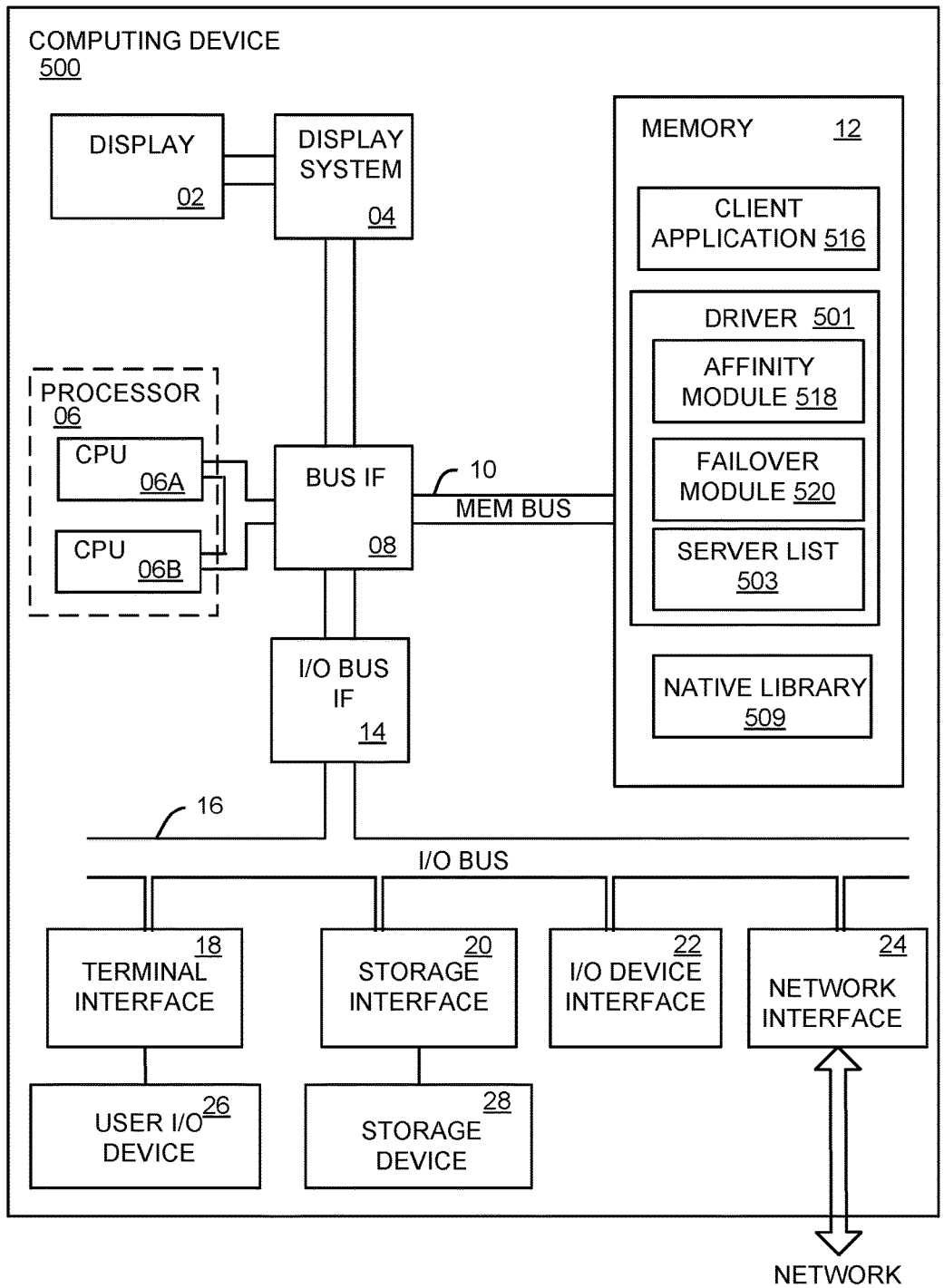
FIG. 5 is a block diagram of a computing device that includes an affinity module and a failover module, according to embodiments.

Consistent with some embodiments, the compute nodes 102, 104, and/or 106 may be configured the same or analogous to the computing device 500, as illustrated in FIG. 5. In some database cluster computing environments, more or fewer compute nodes may be present than illustrated in FIG. 1. In various embodiments, one or more of the compute nodes may represent server computing devices, client computing devices, and/or a particular compute instance of a single computing device (e.g., computing components within a chassis, a blade server within a blade enclosure, an I/O drawer, a processor chip, etc.).

As illustrated in FIG. 1, the compute node 102 in some embodiments may include a client application 116 (e.g., a browser, a mobile application, a web application, a cloud application, etc.) that accesses or requests particular database transaction contained in one of the databases. The compute node 102 may also include an affinity module 118, and a failover module 120. The affinity module 118 may be a set (i.e., one or more) of computer readable program instructions configured to establish a local connection to the database 110 upon a request, as described in more detail below. The failover module 120 may also be computer readable program instructions configured to establish a distributed connection to one or more of the databases 114 and/or 112 when a failure (e.g., faulty processor within compute node 102) associated with database 110 occurs. A failover operation may be executed to continue servicing the request from client application 116, which is described in more detail below. The execution of a "failover operation" is an automated process that offloads tasks associated with a particular set of data (e.g., via the failover module 120) originally performed within a first local database (i.e., a requesting client application and database share a same compute node) to a second remote database (e.g., via a TCP/IP connection) when a failure associated with the first database occurs.

In some embodiments, the compute node 106 may include a coordinating module 122. The coordinating module 122 may also be a set of computer readable program instructions configured to calculate the available workload capacity (i.e., saturation level) of each of the compute nodes 102, 104, and 106. An available workload capacity as disclosed herein is a capability of a particular node to service different requests in terms of CPU, memory, and/or other resources available on the particular node. The available workload capacity may be expressed in real-time (or near real-time) and via a weight. A weight is a number or score that denotes the available workload capacity of a particular compute node. For example, a weight of 100 may denote full available workload capacity of a particular compute node, whereas a weight of 80 may denote that the compute node may still have a relatively high workload capacity, but not as high as the weight of 80. A weight of 0 may denote that the particular compute node is saturated and that it has no available workload capacity and will therefore not service any requests. The coordinating module 122 may store a server list, which is a list of IP addresses of each of the compute nodes 102, 104, and 106 and a weight score associated with each IP address. Each of the compute nodes may store and/or utilize the server list and associated weights to decide which node to reroute a session connection to in case of a failure of a node or database, which is described in more detail below. In some embodiments, the coordinating module 122 may calculate the actual workload of a particular compute node and provide an associated score instead or in addition to calculating the available workload capacity via a weight. In some embodiments, the coordinating module 122 may be used when network latency is determined to be not detrimental to the overall performance of a database cluster. In other embodiments, when network latency is determined to be detrimental to the overall performance of a database cluster, the coordinating module 122 is not used route database transaction requests except for requests occurring when a condition requiring a failover is detected.

In some embodiments, one or more of the databases 110, 112, and/or 114 are any suitable database types corresponding to any query language. For example, the query language may be structured query language (SQL) for relational databases, data manipulation language (DML) for inserting, updating, or deleting database records in relational databases, multidimensional expression (MDX) for multidimensional or online analytical procession (OLAP) databases, online transactional processing databases (OLTP), or any other language for any other database.

In some embodiments, the databases 110, 112, and 114 may represent individual servers (e.g., database servers) or a database management system utilized to process and access the actual data within a storage device (e.g., disk). In various embodiments, each of the databases 110, 112, and 114 store either all of a data set in one or more data objects (e.g., replicated data in a shared-everything scheme) or a portion (e.g., particular columns or partitions of a database) of data in one or more data objects (e.g., shared-nothing). For example, each of the databases 110, 112, and 114 may each store a first database file, which includes various tables of data. As discussed above, the storing of the same data may be utilized in case a failover operation needs to be executed.

The compute nodes 102, 104, and/or 106 (and any of the corresponding database management systems) may communicate with another via any suitable network 108. For example, the network 108 may be a local area network (LAN), a general wide area network (WAN), and/or a public network (e.g., the Internet).

The database cluster computing environment 100 illustrates that a particular client application 116 may be located (i.e., executing) within a same compute node 102 that the database 110 is also located within. In an example illustration, the compute node 102 may receive a request for a database transaction from client application 116. In response to the request, the client application 116 may establish a local connection (e.g., via shared memory) to the database 110 to access a set of data, as opposed to establishing a distributed or remote connection (e.g., a TCP/IP connection via network) to one of the databases 112 or 114 that has the most available workload capacity. As discussed above, the local connection between the client application 116 and the database 110 may be conducive to a relatively high speed data retrieval process (e.g., the local connection may be a high speed bus) because the compute node 102 avoids network latency by avoiding connecting (e.g., via a network using a TCP/IP protocol) to any of the databases 112 or 114 to retrieve the data. The term "local" as described herein may refer to one or more components (e.g., databases, applications, etc.) being associated with or located within the same compute node, as opposed to components being located or associated with different or separate compute nodes.

Figure 2:
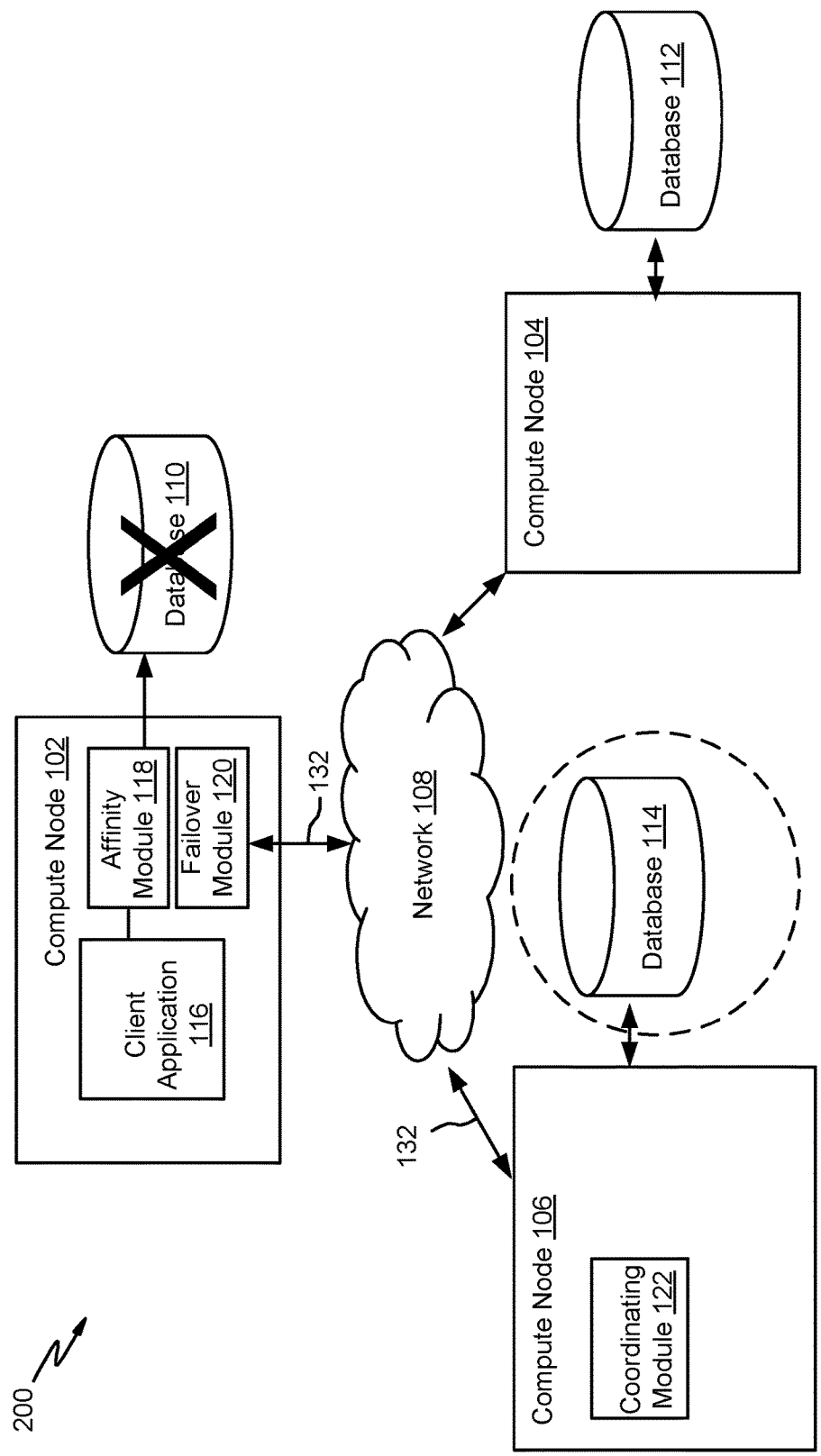
FIG. 2 is a block diagram of the database cluster computing environment of FIG. 1, which illustrates the execution of a failover operation, according to embodiments.

FIG. 2 is a block diagram of the database cluster computing environment of FIG. 1, which illustrates the execution of a failover operation, according to embodiments. FIG. 2 illustrates that when a failure occurs that is associated with database 110 (e.g., a failed processor within node 102), which may cause the database 110 to become unavailable for data access, the client application 116 may establish a distributed or remote connection 132 to the database 114 (via the compute node 106) in order to access the same data. In some embodiments, and as described in more detail below, a device driver within (i.e., executing on) the compute node 102 may have the capability of both establishing a local connection to the database 110 and a distributed or remote connection 132 to the database 114.

Figure 3:
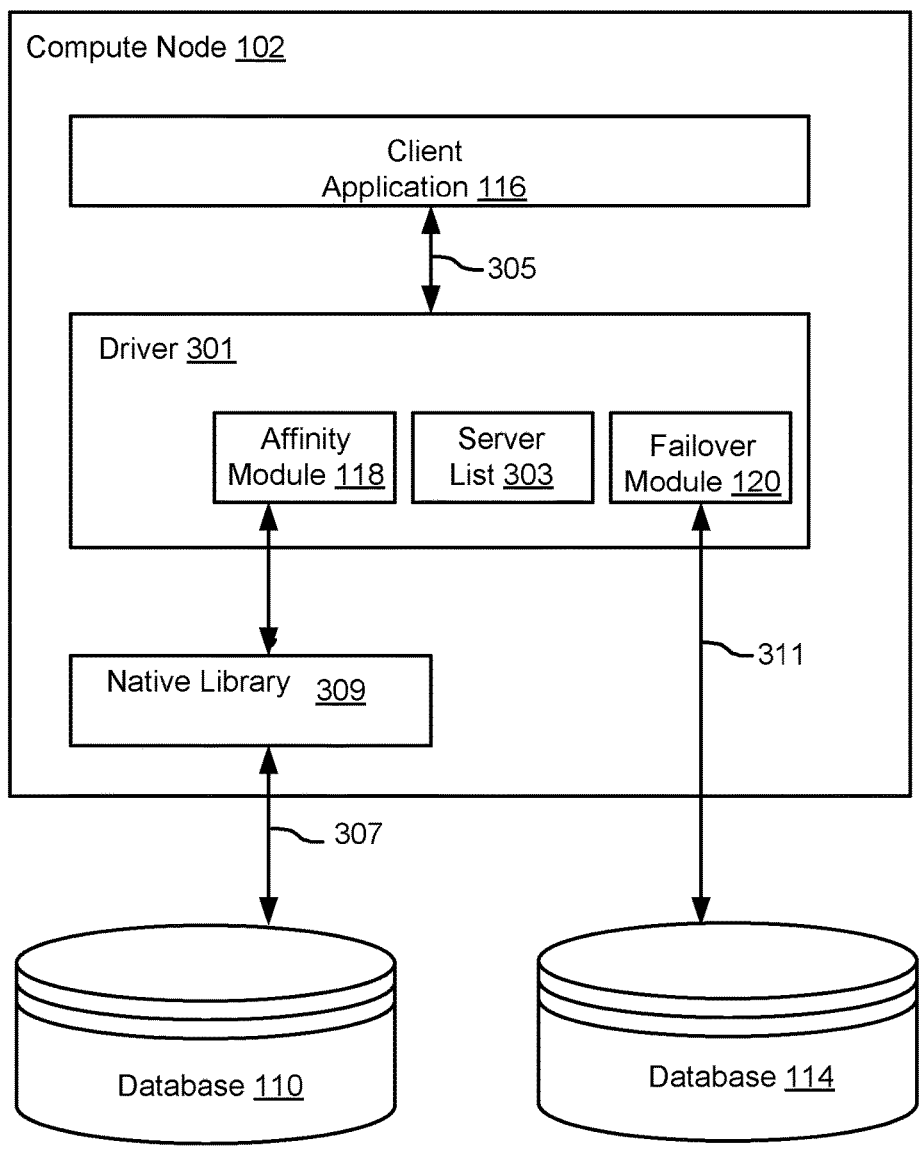
FIG. 3 is a block diagram of a detailed view of one of the compute nodes of FIGS. 1 and 2, which illustrates how connections to databases may be established, according to embodiments.

FIG. 3 is a block diagram of a detailed view of the compute node 102 of FIGS. 1 and 2, which illustrates how connections to databases may be established, according to embodiments. In some embodiments, the compute node 102 may include the client application 116, the device driver 301, and the native library 309, all of which may enable the client application 116 either locally connect to the database 110 or establish a distributed connection with the database 114 in case of a compute node or database failure.

FIG. 3 illustrates that when the application 116 (e.g., a Java application) issues a query request for data (e.g., via an UPDATE operation), the application 116 may first issue an API call 305 (e.g., JDBC call) to the device driver 301. The device driver 301 (e.g., a JDBC device driver) may then convert the query request into a particular suitable language protocol in order to communicate with the appropriate database. The device driver 301 may enable the client application 116 to interact and communicate with any database within a database cluster. In an example illustration, the device driver 301 may convert the API call 305 into a native call 307 (e.g., C/C++ API call) via the affinity module 118 and via the native library 309 in order to access the local database 110. According to various embodiments, the affinity module 118 may be configured to receive every request from the client application 116 and allow automated direct access to the local database 110 via a database manager module, as opposed to rerouting the request to another database. The affinity module 118 may be configured in this manner when it is determined that network latency is detrimental to overall database cluster performance. The native library 309 may be utilized as an interface to the database 110. The native library 309 may include predefined functions that the affinity module 118 calls, which have been compiled for a specific hardware architecture or operating system. The native library 309 may therefore allow the client application 116 to communicate with the local database manager associated with the database 110. The database manager may be a program module configured to process the query via a query processor (e.g., using a query optimizer, selectivity, etc.) and utilize various storage engine modules (e.g., a transaction manager, buffer manager, log manager, etc.) in order to access the data within a storage device (e.g., disk). While FIG. 3 provides an example of a query request, the principles described with respect to FIG. 3 apply to any type of database transaction request.

The connection between the client application 116 and the database 110 may be a local connection (e.g., a connection between a client application and a database, both of which are located on the same compute node). In some embodiments, the local connection may be or may be analogous to a type two JDBC device driver connection. A JDBC type two device driver connection is a connection between a client application and a database that are collocated on the same compute node. In some embodiments, the device driver 301 on behalf of the client application 116 does not utilize distributed TCP/IP connections via a network to initially connect to a remote database upon a query request, but instead establishes a local connection that utilizes shared memory in order to communicate with the local database 110. Shared memory allows two or more processes to share a memory region (e.g. address) such that the processes do not execute system calls into a kernel to pass data between the processes. This may allow the avoiding of generating redundant copies of data made between processes. Library code in the native library 309, for example, may be shared in memory by multiple processes (e.g., processes performed by a database manager and the client application 116). If virtual memory is utilized, various processes may execute the same physical page in Random Access Memory (RAM), which is mapped into different address spaces of each process.

In some embodiments, the device driver 301 may also have the capability to establish a distributed or remote connection 311 whenever there is a failure associated with the database 110. The failover module 120 may be configured to detect a database failure and reroute the client application request to another compute node in response to the detection of a failure condition, e.g., a database or processor failure, which is described in more detail below. For example, as soon as the failover module 120 detects a failure at the compute node 102, which may make the database 110 unavailable for data access, the device driver 301 may establish a TCP/IP connection 311 with the database 114 that is located on compute node 106 in order to access the same data. The compute node 106 may be a node that currently has the greatest available workload capacity of all nodes in the database cluster.

At the TCP level of a TCP/IP stack, compute nodes 102 and 106 (or modules within the respective compute nodes) may establish a TCP connection. This may occur by a handshaking process (e.g., three-way handshake). Specifically, a component or module on the compute node may send a TCP synchronize (SYN) packet to the compute node 106. The compute node 106 may then send a synchronize-acknowledgment (SYN-ACK) to the component or module on compute node 102. The component or module on compute node 102 may then send and acknowledge (ACK) message back to the compute node 106. Consequently, a TCP socket connection may be established to start a session between the client application 116 and the database 114 located on compute node 106.

After a session has been established, the request for a database transaction from the client application 116 may be transmitted through the TCP/IP stack or layers (e.g., application layer (e.g., Hypertext Transfer Protocol (HTTP)), a transport layer (e.g., TCP), a network layer (e.g., IP), and a network interface level). When the request is ready to be transmitted from the client application 116 to the compute node 106 at the physical layer, the request may be transmitted over a Network Interface Card (NIC) located on the compute node 102. Likewise, the accessed data within the database 114 may be transmitted back to the client application 116 via the TCP/IP connection 311 for data retrieval. In some embodiments, the connection between the client application 116 and the database 114 is a type four connection in a JDBC architecture. A type four connection is a network protocol connection (e.g., TCP/IP) between a client application on a first compute node and a database that is located on a second remote compute node.

As illustrated in FIG. 3, the device driver 301 may also include a server list 303. The server list 303 may be a list of each compute node's IP address that is part of the database cluster. Each IP address may have an associated real-time weight score, which determines a workload or workload capacity of that particular compute node. In some embodiments, the compute node 102 may utilize the server list 303 in order to determine which compute node has the most available workload capacity among each of the compute nodes in a database cluster, e.g., compute node 106 (which includes database 114). Calculating a most available workload capacity may be utilized to connect to a different database in case of a failure associated with a particular local database or compute node. For example, the server list 303 may indicate that compute node 106 has the highest weight score (e.g., 100), whereas compute nodes 102 and 104 have lower weight scores (e.g., 60 and 50 respectively). Accordingly, as illustrated in FIG. 3, upon a failure detected with compute node 102, the client application 116 may establish a TCP/IP connection 311 with the database 114 that is located on compute node 106 in response to compute node 106 having the most available workload capacity via the weight score.

Figure 4:
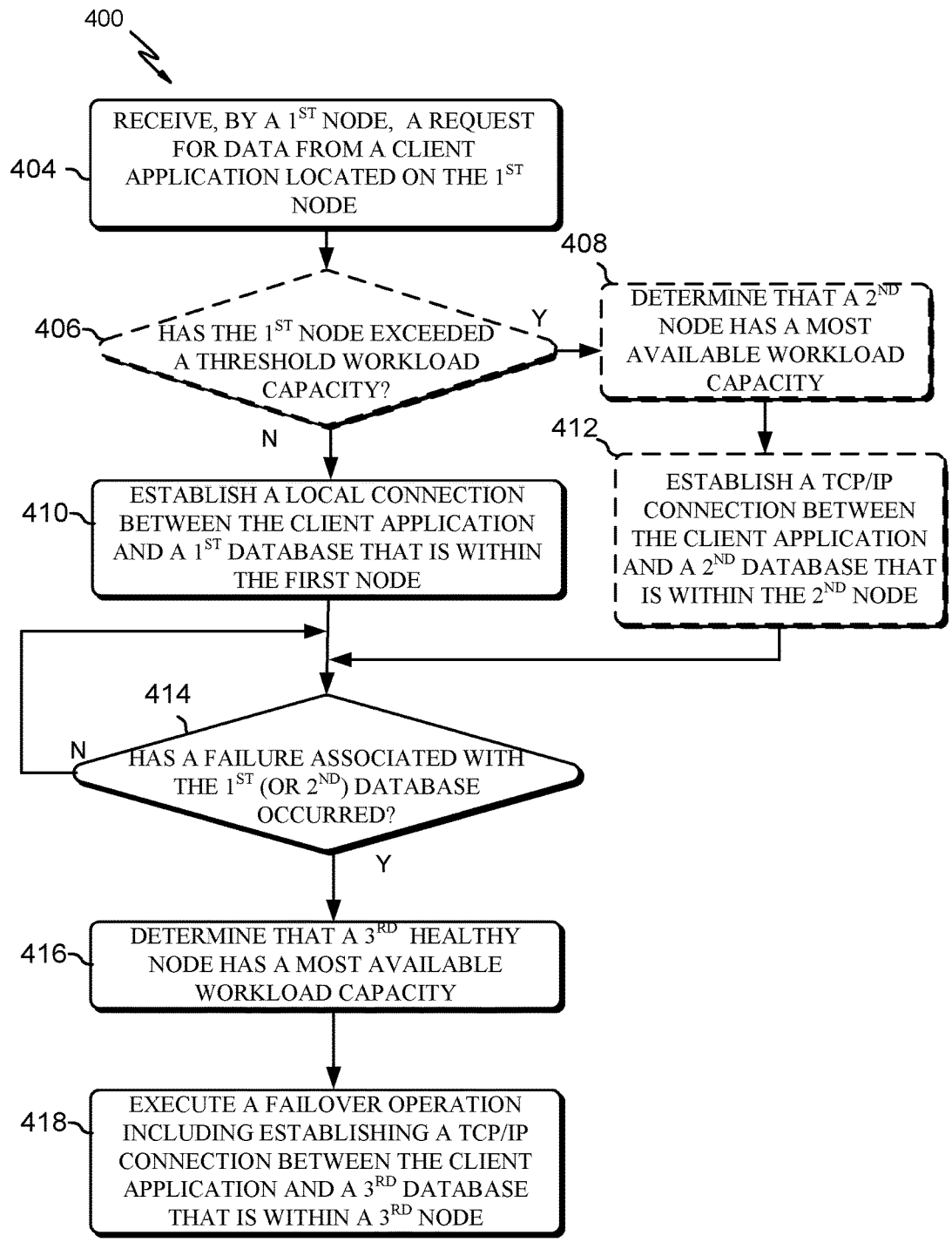
FIG. 4 is a flow diagram of a process for automated local database connection affinity and failover to a distributed connection when a local database fails in a database cluster computing environment, according to embodiments.

FIG. 4 is a flow diagram of a process 400 for automated local database connection affinity and failover to a distributed connection when a local database fails in a database clustering environment, according to embodiments. Various operations of the process 400 may be performed by various modules or components on one or more of the compute nodes in a database cluster, such as the database cluster 100.

The process 400 may begin at block 404 when a first compute node (of a plurality of compute nodes) receives a request for a database transaction (e.g., INSERT, UPDATE, DELETE) from a client application that is located on the first compute node. The plurality of compute nodes may correspond to a database cluster that shares at least a portion (e.g., rows, columns, etc.) of the data. Each compute node may be configured to maintain connectivity (e.g., via the affinity module 118 of FIG. 3) to the same compute node that the requesting client application is on as opposed to routing the request (e.g., via round robin fashion) to another compute node.

Per block 406, it may be determined (e.g., via the server list 303 of FIG. 3) whether the first node has exceeded a threshold workload capacity. For example, if the first compute node is already taking on 5 transactions, which is equivalent to a weight score of 19 then the first compute node may have exceeded a threshold work load capacity (e.g., the threshold being any weight score below 20) and therefore may not be able to service the request in block 404. Per block 408, if the first compute node exceeds a threshold workload capacity, then it may be determined (e.g., via the server list 303 of FIG. 3) that a second compute node has a most available workload capacity (e.g., 80, the highest weight score). Per block 412, in response to determining that the second compute node has the most available workload capacity and determining that network latency is not detrimental to the overall performance of a database cluster, the client application may then establish a distributed or remote (e.g., TCP/IP) connection with a second database on the second compute node in order to service the request made in block 404. In some embodiments, the first compute node may not necessarily route the request to the compute node that has the most available workload capacity, but route the request to a compute node that has an available workload capacity that is above or below some threshold. In some embodiments, blocks 406, 408, and 412 may not occur such that the establishing of the local connection per block 410 is an automated (e.g., performed without regard to whether another compute node of the plurality of compute nodes has a lighter workload than the first compute node) function (and the only function) that is performed in response to the receiving of the request per block 404.

Per block 410, if the first compute node has not exceeded a threshold workload capacity (i.e., the first node is able to service the request) or it is determined that network latency is detrimental to the overall performance of a database cluster, then the client application may establish a local connection with a first database that is within the first compute node. In some embodiments, determining whether the network latency is detrimental may be performed when a user inputs a parameter that specifies the network has a latency exceeds a threshold (is detrimental). In some embodiments, a module monitors whether latency exceeds a threshold (is detrimental).

Per block 414, it may be determined by the first compute node (or second compute node from block 412) (e.g., via the failover module 120 of FIG. 3) whether a failure associated with the first (or second) database has occurred. A "failure" as disclosed herein may mean that one or more of a compute node's resources (e.g., CPU, memory device, database management system, etc.) has experienced a fault that affects accessing or inputting data to or from a database outside of a threshold. For example, a failure may occur when a local connection between the first compute node and the first database is unable to be established. In another example, a faulty processor may be located within the first compute node, which may affect the accessing of the data within the first database.

If no failure has been detected per block 414, then block 414 may be continued to be performed until and if a failure is detected. For example, a failover module (e.g., the failover module 120 of FIG. 3) may poll the first compute node at particular regular intervals (e.g., every 2 minutes) in order to determine if there is a failure associated with a particular database. If no failure is detected, then the polling may continue according to the scheduled interval.

Per block 416, if a failure associated with the first (or second) database has occurred, then the first (or second or other) compute node may determine (e.g., via the server list 303 of FIG. 3) that a third healthy compute node has a most available workload capacity. The first (or second) compute node may determine whether a compute node is "healthy" by determining whether any of the other databases associated with the other compute nodes have been subject to a failure. If any of the other compute nodes have not been subject to a failure, then the first (or second or other) compute node may calculate (e.g., via weight scores) which healthy compute node has the most available workload capacity. In some embodiments, the first (or second or other) compute node may not necessarily determine which compute node has a most available workload capacity, but may determine and select a compute node that has an available workload capacity that is above or below a particular threshold.

Per block 418, in response to determining that the third compute node is healthy and has a most (or is above a threshold) available workload capacity, the first (or second) compute node may execute (e.g., via the failover module 120 of FIG. 3) a failover operation associated with the third compute node. The execution of the failover operation may include establishing a distributed connection between the client application and a third database that is within the third compute node.

FIG. 5 is a block diagram of a computing device 500 that includes an affinity module 518 and a failover module 520, according to embodiments. The components of the computing device 500 can include one or more processors 06, a memory 12, a terminal interface 18, a storage interface 20, an Input/Output ("I/O") device interface 22, and a network interface 24, all of which are communicatively coupled, directly or indirectly, for inter-component communication via a memory bus 10, an I/O bus 16, bus interface unit ("IF") 08, and an I/O bus interface unit 14.

The computing device 500 may include one or more general-purpose programmable central processing units (CPUs) 06A and 06B, herein generically referred to as the processor 06. In an embodiment, the computing device 500 may contain multiple processors; however, in another embodiment, the computing device 500 may alternatively be a single CPU device. Each processor 06 executes instructions stored in the memory 12 (e.g., the affinity module 518 and the failover module 520 instructions).

The computing device 500 may include a bus interface unit 08 to handle communications among the processor 06, the memory 12, the display system 04, and the I/O bus interface unit 14. The I/O bus interface unit 14 may be coupled with the I/O bus 16 for transferring data to and from the various I/O units. The I/O bus interface unit 14 may communicate with multiple I/O interface units 18, 20, 22, and 24, which are also known as I/O processors (IOPs) or I/O adapters (IOAs), through the I/O bus 16. The display system 04 may include a display controller, a display memory, or both. The display controller may provide video, audio, or both types of data to a display device 02. The display memory may be a dedicated memory for buffering video data. The display system 04 may be coupled with a display device 02, such as a standalone display screen, computer monitor, television, a tablet or handheld device display, or another other displayable device. In an embodiment, the display device 02 may include one or more speakers for rendering audio. Alternatively, one or more speakers for rendering audio may be coupled with an I/O interface unit. In alternate embodiments, one or more functions provided by the display system 04 may be on board an integrated circuit that also includes the processor 06. In addition, one or more of the functions provided by the bus interface unit 08 may be on board an integrated circuit that also includes the processor 06.

The I/O interface units support communication with a variety of storage and I/O devices. For example, the terminal interface unit 18 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 26 and the computing device 500, may receive output data via the user output devices. For example, a user interface may be presented via the user I/O device 26, such as displayed on a display device, played via a speaker, or printed via a printer.

The storage interface 20 supports the attachment of one or more disk drives or direct access storage devices 28 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 28 may be implemented via any type of secondary storage device. The contents of the memory 12, or any portion thereof, may be stored to and retrieved from the storage device 28 as needed. The storage devices 28 may be employed to store any of the databases described herein, including databases 110, 112, and 114. The I/O device interface 22 provides an interface to any of various other I/O devices or devices of other types, such as printers or fax machines. The network interface 24 provides one or more communication paths from the computing device 500 to other digital devices and computer systems.

Although the computing device 500 shown in FIG. 5 illustrates a particular bus structure providing a direct communication path among the processors 06, the memory 12, the bus interface 08, the display system 04, and the I/O bus interface unit 14, in alternative embodiments the computing device 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 14 and the I/O bus 08 are shown as single respective units, the computing device 500, may include multiple I/O bus interface units 14 and/or multiple I/O buses 16. While multiple I/O interface units are shown, which separate the I/O bus 16 from various communication paths running to the various I/O devices, in other embodiments, some or all of the I/O devices are connected directly to one or more system I/O buses.

In various embodiments, the computing device 500 is a multi-user mainframe computer system, a single-user system, or a server computer or similar device that has little or no direct user interface, but receives requests from other computer systems (clients). In other embodiments, the computing device 500 may be implemented as a desktop computer, portable computer, laptop or notebook computer, tablet computer, pocket computer, telephone, smart phone, or any other suitable type of electronic device. The computing device 500 may be any of the compute nodes 102, 104, and/or 106 of FIG. 1.

In an embodiment, the memory 12 may include a random-access semiconductor memory, storage device, or storage medium (either volatile or non-volatile) for storing or encoding data and programs. In another embodiment, the memory 12 represents the entire virtual memory of the computing device 500, and may also include the virtual memory of other computer systems coupled to the computing device 500 or connected via a network 30. The memory 12 may be a single monolithic entity, but in other embodiments the memory 12 may include a hierarchy of caches and other memory devices. For example, memory may exist in multiple levels of caches, and these caches may be further divided by function, so that one cache holds instructions while another holds non-instruction data, which is used by the processor. Memory 12 may be further distributed and associated with different CPUs or sets of CPUs, as is known in any various so-called non-uniform memory access (NUMA) computer architectures.

The memory 12 may store all or a portion of the components and data (e.g., affinity module 518) shown in FIG. 5. These programs and data are illustrated in FIG. 5 as being included within the memory 12 in the computing device 500; however, in other embodiments, some or all of them may be on different computer systems and may be accessed remotely, e.g., via a network 30. The computing device 500 may use virtual addressing mechanisms that allow the programs of the computing device 500 to behave as if they only have access to a large, single storage entity instead of access to multiple, smaller storage entities. Thus, while the components and data shown in FIG. 5 are illustrated as being included within the memory 12, these components and data are not necessarily all completely contained in the same storage device at the same time. Although the components and data shown in FIG. 5 are illustrated as being separate entities, in other embodiments some of them, portions of some of them, or all of them may be packaged together.

In some embodiments, the memory 12 may include program instructions or modules, such as the client application 516, device driver 501, and the native library 509. The device driver 501 may include the affinity module 518, the failover module 520, and the server list 503. These program instructions or modules may be configured to automated local database connection affinity and failover to a distributed connection when a local database fails in a database clustering environment. In some embodiments these program instructions or modules may be consolidated into one module or be divided into separate modules. For example, the server list 503 may not necessarily be a part of the device driver 501 but may be a separate module.

In an embodiment, the components and data shown in FIG. 5 (e.g., the affinity module 518 and the failover module 520) may include instructions or statements that execute on the processor 06 or instructions or statements that are interpreted by instructions or statements that execute on the processor 06 to carry out the functions as described above. In another embodiment, the components shown in FIG. 5 may be implemented in hardware via semiconductor devices, chips, logical gates, circuits, circuit cards, and/or other physical hardware devices in lieu of, or in addition to, a processor-based system. In an embodiment, the components shown in FIG. 5 may include data in addition to instructions or statements.

FIG. 5 is intended to depict representative components of the computing device 500. Individual components, however, may have greater complexity than represented in FIG. 5. In FIG. 5, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different ways, including using various computer applications, routines, components, programs, objects, modules, data pages etc., which may be referred to herein as "software," "computer programs," or simply "programs."

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for automating local database connection affinity and failover in a database cluster, the computer program product comprising a computer readable storage medium having program code embodied therewith, the program code executable/readable by a first compute node to perform a method, the method comprising:

receiving, by the first compute node of a plurality of compute nodes of the database cluster and from a client application, a request for data associated with a particular database transaction, the plurality of compute nodes sharing at least a portion of the data, the client application is located within the first compute node, wherein the client application is a Java application;

determining, by the first compute node, that network latency is detrimental to an overall performance of the database cluster;

in response to the determining, establishing, without regard to whether another compute node of the plurality of compute nodes has a lighter workload than the first compute node, a first connection between the client application and a first database of the database cluster, the first connection being a local connection, wherein the first database is located within the first compute node and the client application accesses the first database via shared memory, and wherein a Java Database Connectivity (JDBC) device driver located within the first compute node performs the establishing of the first connection, the JDBC device driver enables the client application to interact with the database cluster;

detecting, by the first compute node, that a failure associated with the first database has occurred;

in response to the detecting of the failure, determining, by the JDBC device driver, that a second compute node has a most available workload capacity to service the request among the plurality of compute nodes, wherein the JDBC device driver includes a list that comprises calculations indicating a workload capacity of each of the plurality of compute nodes of the database cluster; and in response to the determining that the second compute node has a most available workload capacity, executing, by the JDBC device driver, a failover operation to continue servicing the request for the data, the executing a failover operation including establishing a second connection between the client application and a second database of the database cluster, the second database including the data, the second connection being a Transmission Control Protocol/Internet Protocol (TCP/IP) connection, wherein the second database is remote to the first compute node and the second database is within a second compute node.

\* \* \* \* \*